United States Patent
Wang (10) Patent No.: US 11,941,529 B2
(45) Date of Patent: Mar. 26, 2024

(54) METHOD AND APPARATUS FOR PROCESSING MOUTH IMAGE

(71) Applicant: BEIJING BYTEDANCE NETWORK TECHNOLOGY CO., LTD., Beijing (CN)

(72) Inventor: Shiyin Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 824 days.

(21) Appl. No.: 16/981,084

(22) PCT Filed: Nov. 16, 2018

(86) PCT No.: PCT/CN2018/115971
§ 371 (c)(1),
(2) Date: Sep. 15, 2020

(87) PCT Pub. No.: WO2020/056902
PCT Pub. Date: Mar. 26, 2020

(65) Prior Publication Data
US 2020/0410213 A1    Dec. 31, 2020

(30) Foreign Application Priority Data

Sep. 20, 2018   (CN) .......................... 201811102339.7

(51) Int. Cl.
*G06F 18/24*       (2023.01)
*G06F 18/214*      (2023.01)
(Continued)

(52) U.S. Cl.
CPC ........... *G06N 3/084* (2013.01); *G06F 18/214* (2023.01); *G06F 18/2431* (2023.01);
(Continued)

(58) Field of Classification Search
USPC ............ 382/128–159, 164–224; 704/1–275; 706/1–62, 900–903
See application file for complete search history.

(56) References Cited

U.S. PATENT DOCUMENTS 10,936,919 B2 * 3/2021 Du ...................... G06V 10/806
2004/0013306 A1   1/2004 Lee
(Continued)

FOREIGN PATENT DOCUMENTS

CN     101706872 A    5/2010
CN     105320945 A    2/2016
(Continued)

OTHER PUBLICATIONS

Wen Shiping, Face marking method based on sparse full-convolution neural network; Feb. 23, 2018 (Year: 2018).*
(Continued)

*Primary Examiner* — Marcellus J Augustin
(74) *Attorney, Agent, or Firm* — BakerHostetler (57) ABSTRACT

The embodiments of the present disclosure disclose a method and apparatus for processing a mouth image. A specific embodiment of the method includes: obtaining a mouth image to be processed (201); inputting the mouth image into a pre-trained mouth detection model to obtain an output result information, wherein the output result information is used for representing a probability that a content displayed by a pixel point in the mouth image belongs to a class in a target class set (202), the target class set comprising at least one of a first class for representing teeth, a second class for representing mouth illumination, and a third class for representing lips; and processing the mouth image
(Continued)

according to the output result information to obtain a processed mouth image (203). The method achieves pixel point-level processing of the mouth image.

15 Claims, 5 Drawing Sheets

(51) Int. Cl.
    *G06F 18/2431* (2023.01)
    *G06N 3/084* (2023.01)
    *G06N 20/00* (2019.01)
    *G06V 10/70* (2022.01)
    *G06V 10/764* (2022.01)
    *G06V 10/82* (2022.01)
    *G06V 40/00* (2022.01)
    *G06V 40/16* (2022.01)

(52) U.S. Cl.
    CPC .......... *G06N 20/00* (2019.01); *G06V 10/764* (2022.01); *G06V 10/82* (2022.01); *G06V 40/165* (2022.01); *G06V 40/171* (2022.01)

(56) References Cited

U.S. PATENT DOCUMENTS

| | | | |
|---|---|---|---|
| 2007/0297675 A1 | 12/2007 | Lee et al. | |
| 2010/0092075 A1 | 4/2010 | Lee et al. | |
| 2013/0343647 A1* | 12/2013 | Aoki | G06T 7/90 |
| | | | 382/165 |
| 2016/0267686 A1* | 9/2016 | Ohta | G06V 40/171 |
| 2019/0180443 A1* | 6/2019 | Xue | G06V 10/44 |

FOREIGN PATENT DOCUMENTS

| | | |
|---|---|---|
| CN | 107729819 A | 2/2018 |
| CN | 108491825 A | 9/2018 |

OTHER PUBLICATIONS

Wang, Jing-wei;A Face Recognition Method and Device, May 22, 2018 (Year: 2018).*
International Patent Application No. PCT/CN2018/115971; Int'l Search Report; dated Jun. 19, 2019; 2 pages.

* cited by examiner

METHOD AND APPARATUS FOR PROCESSING MOUTH IMAGE

CROSS-REFERENCE TO RELATED APPLICATION

The present disclosure is the U.S. National Stage of International Application No. PCT/CN2018/115971, filed on Nov. 16, 2018, which claims priority to Chinese Patent Application No. 201811102339.7, filed on Sep. 20, 2018, entitled "Method and Apparatus for Processing Mouth Image", by Beijing ByteDance Network Technology Co., Ltd., which is incorporated herein by reference in its entirety.

TECHNICAL FIELD

The embodiments of the present disclosure relate to the field of computer technology, more particularly to a method and apparatus for processing a mouth image.

BACKGROUND

When performing special effect processing such as beautification on the mouth, a region at a fixed position with respect to a face image is generally taken as a mouth image, and lips, teeth and other parts are further predicted according to relative positions in the mouth image such that various parts of the mouth are processed.

SUMMARY OF THE DISCLOSURE

The embodiments of the present disclosure propose a method and apparatus for processing a mouth image.

In the first aspect, an embodiment of the present disclosure provides a method for processing a mouth image, comprising: obtaining a mouth image to be processed; inputting the mouth image into a pre-trained mouth detection model to obtain output result information, wherein the output result information is used for representing a probability that a content displayed by a pixel point in the mouth image belongs to a class in a target class set, the target class set comprising at least one of a first class for representing teeth, a second class for representing mouth illumination, and a third class for representing lips; and processing the mouth image according to the output result information to obtain a processed mouth image.

In some embodiments, processing the mouth image according to the output result information to obtain the processed mouth image comprises: processing a pixel point with a corresponding probability larger than a target probability threshold in response to determining that the target class set comprises one of the first class, the second class and the third class to obtain the processed mouth image.

In some embodiments, the target class set comprises the second class; and processing the pixel point with the corresponding probability larger than the target probability threshold to obtain the processed mouth image comprises: selecting a pixel point with a corresponding probability larger than the target probability threshold as a target pixel point to obtain a target pixel point set; and processing a target pixel point in the target pixel point set, such that the processed target pixel point becomes a highlight point in the mouth image.

In some embodiments, processing the mouth image according to the output result information to obtain the processed mouth image comprises: for the pixel point in the mouth image, determining a probability that the pixel point does not belong to any of the classes in the target class set as a non-target probability in response to determining that the target class set comprises at least two of the first class, the second class and the third class; taking a class corresponding to the largest of at least two probabilities corresponding to the pixel point and the non-target probability as a result class; and performing processing operation corresponding to the result class on the pixel point.

In some embodiments, for the pixel point in the mouth image, the sum of the probabilities corresponding to the pixel point and the non-target probability is one.

In some embodiments, the mouth detection model is obtained by training according to the following steps: obtaining an initial class detection model, wherein the initial class detection model comprises an initial mouth detection model and an initial classification model connected with the initial mouth detection model, wherein the initial classification model takes an output of the initial mouth detection model as an input, and class information representing a class to which a content displayed by the pixel point in the mouth image belongs as an output; obtaining a training sample set, wherein a training sample comprises a mouth image and class information used for representing a class to which a content displayed by the pixel point in the mouth image belongs; carrying out training using a machine learning method with the mouth image in the training sample in the training sample set as an input of the initial class detection model and the class information corresponding to the input mouth image as an expected output of the initial class detection model to obtain a trained initial class detection model; and determining a trained initial mouth detection model comprised in the trained initial class detection model as the mouth detection model.

In the second aspect, an embodiment of the present disclosure provides an apparatus for processing a mouth image, comprising: an obtaining unit configured to obtain a mouth image to be processed; a detection unit configured to input the mouth image into a pre-trained mouth detection model to obtain an output result information, wherein the output result information is used for representing a probability that a content displayed by a pixel point in the mouth image belongs to a class in a target class set, the target class set comprising at least one of a first class for representing teeth, a second class for representing mouth illumination, and a third class for representing lips; and a processing unit configured to process the mouth image according to the output result information to obtain a processed mouth image.

In some embodiments, the processing unit is further configured to: processing a pixel point with a corresponding probability larger than a target probability threshold in response to determining that the target class set comprises one of the first class, the second class and the third class to obtain the processed mouth image.

In some embodiments, the target class set comprises the second class; and the processing unit is further configured to: select a pixel point with a corresponding probability larger than the target probability threshold as a target pixel point to obtain a target pixel point set; and process the target pixel point in the target pixel point set, such that the processed target pixel point becomes a highlight point in the mouth image.

In some embodiments, the processing unit is further configured to: for the pixel point in the mouth image, determine a probability that the pixel point does not belong to any of the classes in the target class set as a non-target probability in response to determining that the target class set comprises at least two of the first class, the second class and the third class; take a class corresponding to the largest of at least two probabilities corresponding to the pixel point and the non-target probability as a result class; and perform processing operation corresponding to the result class on the pixel point.

In some embodiments, for the pixel point in the mouth image, the sum of the probabilities corresponding to the pixel point and the non-target probability is one.

In some embodiments, the mouth detection model is obtained by training according to the following steps: obtaining an initial class detection model, wherein the initial class detection model comprises an initial mouth detection model and an initial classification model connected with the initial mouth detection model, wherein the initial classification model takes an output of the initial mouth detection model as an input, and class information representing a class to which a content displayed by the pixel point in the mouth image belongs as an output; obtaining a training sample set, wherein a training sample comprises a mouth image and class information used for representing a class to which a content displayed by the pixel point in the mouth image belongs; carrying out training using a machine learning method with the mouth image in the training sample in the training sample set as an input of the initial class detection model and the class information corresponding to the input mouth image as an expected output of the initial class detection model to obtain a trained initial class detection model; and determining a trained initial mouth detection model comprised in the trained initial class detection model as the mouth detection model.

In the third aspect, an embodiment of the present disclosure provides an electronic device, comprising: one or more processors; and a storage device with one or more programs stored therein, the one or more programs, when executed by the one or more processors, causing the one or more processors to implement the method described in any one of implementations in the first aspect.

In the fourth aspect, an embodiment of the present disclosure provides a computer readable medium with a computer program stored therein, wherein the program, when executed by a processor, causes the processor to implement the method described in any one of implementations in the first aspect.

According to the method and apparatus for processing a mouth image provided by the embodiments of the present disclosure, a mouth image to be processed is obtained; the mouth image is input into a pre-trained mouth detection model to obtain an output result information, wherein the output result information is used for representing a probability that a content displayed by a pixel point in the mouth image belongs to a class in a target class set, the target class set including at least one of a first class for representing teeth, a second class for representing mouth illumination, and a third class for representing lips; and the mouth image is processed according to the output result information to obtain a processed mouth image, so that according to a probability that each pixel point in the mouth image belongs to a corresponding class, the content displayed by the pixel point is classified, thereby achieving pixel point level processing of the mouth image, and also improving precision and accuracy of the processing.

BRIEF DESCRIPTION OF THE DRAWINGS

Other features, objects, and advantages of the present disclosure will become apparent from the following detailed description of non-limiting embodiments with reference to the accompanying drawings, in which.

DETAILED DESCRIPTION

The present disclosure will be described in further detail below with reference to the accompanying drawings and embodiments. It is to be understood that the specific embodiments described herein are merely illustrative of the relevant disclosure and are not limiting of the disclosure. It is also to be noted that for ease of description, only those portions that are pertinent to the relevant disclosure are shown in the accompanying drawings.

It should be noted that the embodiments and features in the embodiments of the present disclosure may be combined with one another without conflict. The present disclosure will now be described in detail in conjunction with the embodiments with reference to the accompanying drawings.

Figure 1:
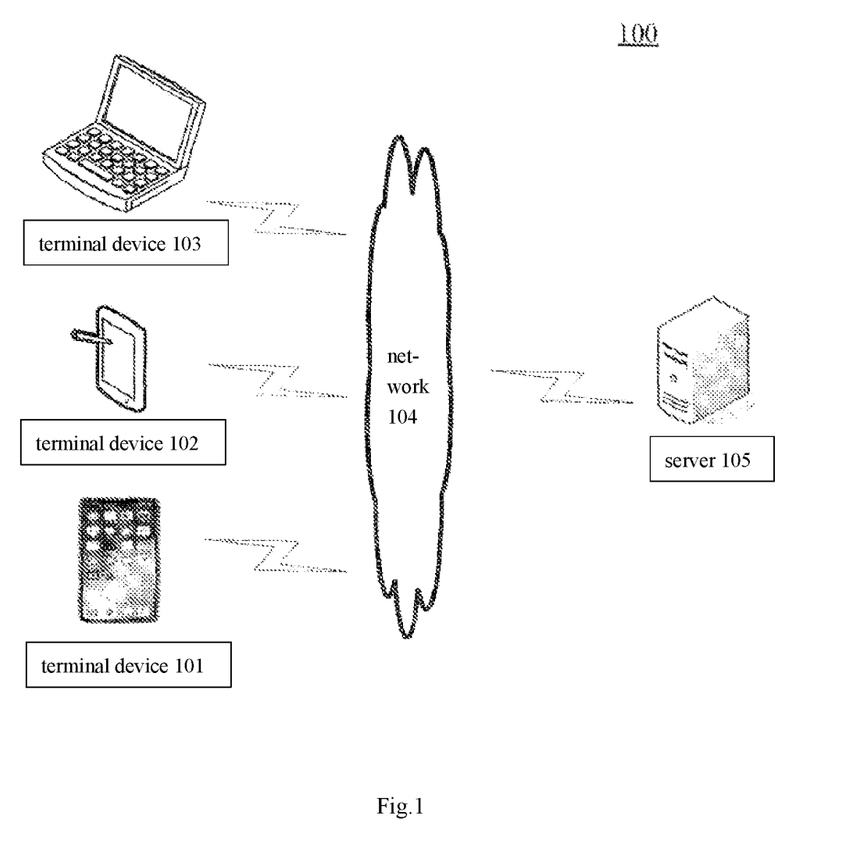
FIG. 1 is a diagram illustrating an exemplary system architecture to which an embodiment of the present disclosure may be applied.

FIG. 1 shows an exemplary architecture 100 in which an embodiment of a method for processing a mouth image or an apparatus for processing a mouth image of the present disclosure may be applied.

As shown in FIG. 1, the system architecture 100 may include terminal devices 101, 102 and 103, a network 104, and a server 105. The network 104 serves as a medium for providing a communication link between the terminal devices 101, 102 and 103 and the server 105. The network 104 may include various types of connection, such as wired or wireless communication links, or fiber optic cables, etc.

The terminal devices 101, 102 and 103 interact with the server 105 via the network 104 to receive or send messages or the like. Various client applications may be installed in the terminal devices 101, 102 and 103, such as photography applications, image processing applications, etc.

The terminal devices 101, 102 and 103 may be hardware or software. When the terminal devices 101, 102 and 103 are hardware, they may be electronic devices that support image storage and image transmission, including but not limited to, smart phones, tablet computers, e-book readers, laptop and desktop computers, etc. When the terminal devices 101, 102 and 103 are software, they may be installed in the electronic devices listed above. It may be implemented either as multiple software or software modules (e.g., multiple software or software modules used to provide distributed services) or as a single software or software module. It is not specifically limited herein.

The server 105 may be a server that provides various services, such as an image processing server that processes mouth images sent by the terminal devices 101, 102 and 103.

Further, the image server may transmit processed mouth images to the terminal devices.

It should be noted that the afore mentioned mouth images may also be directly stored locally on the server 105, and the server 105 may directly extract and process the locally stored mouth images, in which case the terminal devices 101, 102 and 103 and the network 104 may not be present.

It should be noted that the method for processing a mouth image provided by the embodiment of the present disclosure is generally performed by the server 105, and accordingly, the apparatus for processing a mouth image is generally provided in the server 105.

It should also be noted that the terminal devices 101, 102 and 103 may be installed with image processing applications therein, and may also process mouth images based on the image processing applications, in which case the method for processing a mouth image may be performed by the terminal devices 101, 102 and 103, and accordingly, the apparatus for processing a mouth image may be provided in the terminal devices 101, 102 and 103. At this point, the server 105 and the network 104 may not be present in the exemplary system architecture 100.

It should be noted that the server may be hardware or software. When the server is hardware, it may be implemented as a distributed server cluster composed of multiple servers or as a single server. When the server is software, it may be implemented as multiple software or software modules (e.g., multiple software or software modules used to provide distributed services) or as a single software or software module. It is not specifically limited herein.

It should be appreciated that the number of the terminal devices, networks and servers in FIG. 1 is merely illustrative. Any number of terminal devices, networks, and servers may be provided, depending on implementation needs.

Figure 2:
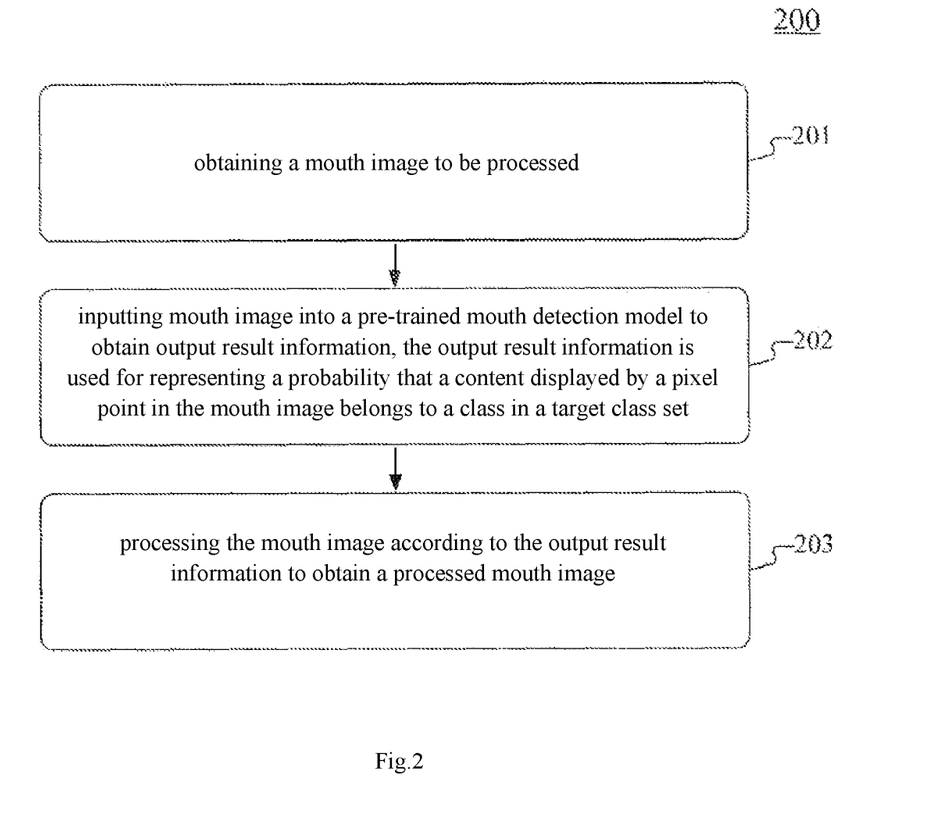
FIG. 2 is a flowchart of a method for processing a mouth image according to an embodiment of the present disclosure.

Continue to refer to FIG. 2, a process 200 of a method for processing a mouth image according to an embodiment of the present disclosure is shown. The method for processing a mouth image includes the following steps:

Step 201, a mouth image to be processed is obtained.

In this embodiment, an executive subject for processing a mouth image (such as the server 105 shown in FIG. 1) may firstly obtain a mouth image to be processed from local or other storage devices (such as the terminal devices 101, 102 and 103 shown in FIG. 1) through a wired connection or a wireless connection.

Among others, the mouth image may refer to an image in which a mouth is displayed. For example, the mouth image may include a face image or may refer to a mouth image extracted from the face image. It should be appreciated that lips, teeth and other parts may be displayed in the mouth image.

Step 202, the mouth image is input into a pre-trained mouth detection model to obtain output result information, wherein the output result information is used for representing a probability that a content displayed by pixel point in the mouth image belongs to a class in a target class set.

In this embodiment, the target class set may be a set of classes specified in advance. The number of classes contained in the target class set may be arbitrary. For example, the target class set may include at least one of a first class for representing teeth, a second class for representing mouth illumination, and a third class for representing lips. Among others, mouth illumination may be used to indicate illumination conditions of the mouth. For example, highlight parts and shadow parts may be generated due to illumination in different directions, etc.

Among others, the output result information of the mouth detection model may be a probability set which includes probabilities corresponding to each pixel point. Among others, each pixel point may correspond to one probability set. When the target class set contains only one class, each pixel point corresponds to one probability. When the target class set contains two classes, each pixel point corresponds to two probabilities. By analogy, when the target class set contains N classes, each pixel point corresponds to N probabilities.

Alternatively, the mouth detection model may be obtained by training according to the following steps:

Step 1, a training sample set is obtained, wherein each training sample may include a mouth image and a probability that a content displayed by each pixel point in the mouth image belongs to a class in the target class set.

In this step, the probability corresponding to each pixel point may be labeled according to a color value of the pixel point. For example, a correspondence between color values and probabilities corresponding to various classes may be preset.

Step 2, an initialized mouth detection model is determined.

The initialized mouth detection model may be artificial neural networks of various types which are untrained or incomplete trained, or may be a model obtained by combination of artificial neural networks of various types. The initialized mouth detection model may also be a network model designed and established by a technician.

For example, the initialized mouth detection model may be established according to actual application requirements, such as which layers need to be included, the number of layers in each layer, the size of the convolution kernel, etc.

Step 3, the initialized mouth detection model is trained using the training sample set to obtain the mouth detection model.

Specifically, training may be carried out with the mouth image in each training sample as an input of the initialized mouth detection model and a probability corresponding to each pixel point in the input mouth image as an expected output of mouth detection so as to obtain the mouth detection model based on a preset loss function.

Among others, the loss function may be used for representing a degree of difference between an actual output of the initialized mouth detection model and a probability corresponding to each pixel point in the training sample. In particular, parameters of each layer of the initialized mouth detection model may be adjusted using a back propagation method according to the value of the loss function. When it is determined that a preset training ending condition is met, the training may be ended, and the trained initialized mouth detection model is determined as the mouth detection model.

The training ending condition may be set in advance. For example, the training ending condition may be that the time of training exceeds a preset duration, that the number of times of training exceeds a preset number of times, or that the value of the loss function is smaller than a preset difference threshold for multiple successive times.

Alternatively, the mouth detection model may be obtained by training according to the following steps:

Step 1, an initial class detection model is obtained. Among others, the initial class detection model includes an initial mouth detection model and an initial classification model connected with the initial mouth detection model.

The initial mouth detection model may take a mouth image as an input and a probability that a content displayed by each pixel point in the mouth image belongs to a class in the target class set as an output. The initial classification model may take an output of the initial mouth detection model as an input, and class information representing a class to which a content displayed by each pixel point in a mouth image belongs as an output.

Among others, the initial mouth detection model may be artificial neural networks of various types which are untrained or incomplete trained, or may be a model obtained by combination of artificial neural networks of various types. The initialized mouth detection model may also be a network model designed and established by a technician. For example, the initialized mouth detection model may be established according to actual application requirements, such as which layers need to be included, the number of layers in each layer, the size of the convolution kernel, etc. The initial classification model may be a classifier for classifying input information.

Step 2, a training sample set is obtained. Among others, a training sample may include a mouth image and class information used for representing a class to which a content displayed by each pixel point in the mouth image belongs.

In this step, an image region corresponding to each class in the target class set may be located firstly, and then pixel points in each region are manually labeled with the corresponding class, so that each pixel point is labeled with the class information. For instance, taking the first class representing teeth as an example, an image region where the teeth are located may be roughly located firstly (e.g., may be determined based on color values corresponding to the pixel points), and then each pixel point may be manually labeled in a direction from the edge of the image region toward the geometric center of the image region. When a pixel point which does not belong to the first class is to be labeled, a refresh may be carried out to obtain a new image region, and pixel points which have not yet been labeled on the edge of the new image region are labeled, and the operations are repeated until the pixel points covered by the edge of a new image region all correspond to the first class, and all the pixel points contained in the image region may be labeled as the first class.

Step 3, training is carried out using a machine learning method with the mouth image in training sample in the training sample set as an input of the initial class detection model and the class information corresponding to the input mouth image as an expected output of the initial class detection model to obtain a trained initial class detection model.

In this step, the initial class detection model may be trained using the entirety of the training samples to obtain the trained initial class detection model.

Step 4, a trained initial mouth detection model included in the trained initial class detection model is determined as the mouth detection model.

Step 203, according to the output result information, the mouth image is processed to obtain a processed mouth image.

In this embodiment, the mouth image may be differently processed according to actual application requirements based on the output result information. For example, a correspondence between processing operation corresponding to each class and probabilities may be set in advance. At this point, corresponding processing operation may be performed according to the probability corresponding to each pixel point.

Alternatively, when the target class set includes one of the first class, the second class and the third class, the pixel point with a corresponding probability larger than a target probability threshold may be processed to obtain a processed mouth image. Among others, the target probability threshold may be set in advance by a technician, and may also be set according to the obtained probability corresponding to each pixel point.

Taking the second class for representing mouth illumination as an example, a pixel point with a corresponding probability larger than a target probability threshold may be firstly selected as a target pixel point to obtain a target pixel point set. Then, target pixel point in the target pixel point set may be processed, such that the processed target pixel point becomes a highlight point in the mouth image. For example, the color of the target pixel point may be set to be a preset highlight color. Alternatively, the brightness of the highlight color may further be proportional to the corresponding probability of corresponding target pixel point.

Figure 3:
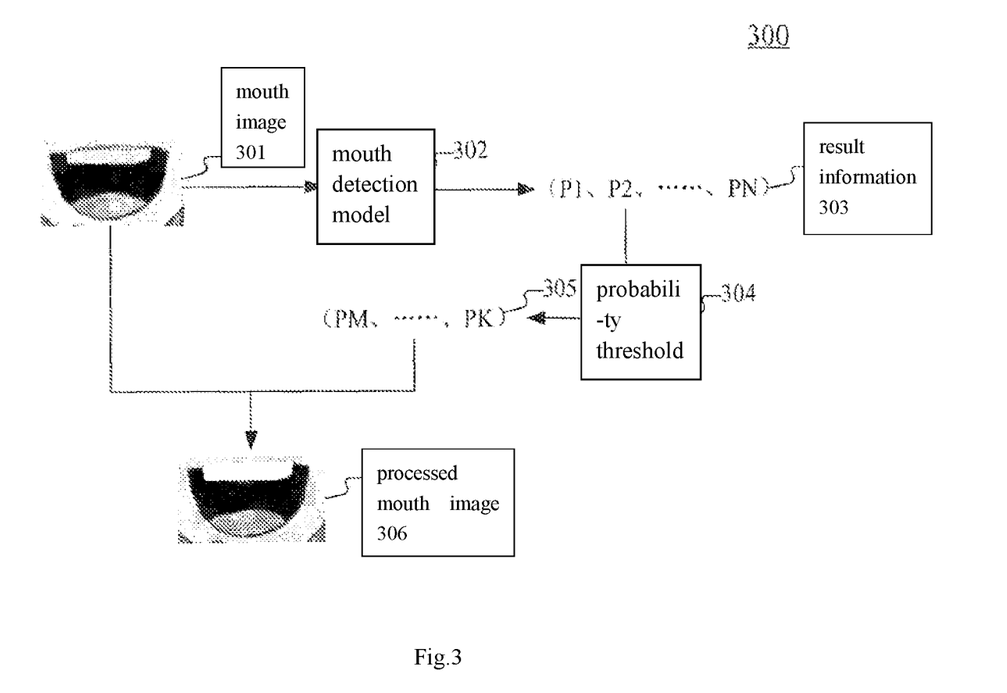
FIG. 3 is a schematic diagram of an application scenario of the method for processing a mouth image according to an embodiment of the present disclosure.

Continue to refer to FIG. 3, FIG. 3 is a schematic diagram of an application scenario of the method for processing a mouth image according to this embodiment. In the application scenario in FIG. 3, an executive subject for processing a mouth image (such as the server 105 shown in FIG. 1) may first obtain a mouth image 301 to be processed from other storage devices, and then input the mouth image 301 to a pre-trained mouth detection model 302 to obtain output result information 303. Among others, the output result information 303 may be used for representing a probability that a content displayed by a pixel point in the mouth image belongs to the first class representing teeth. Specifically, as indicated by the reference numeral 303, each pixel point in the mouth image 301 corresponds to one probability to represents a probability that the content displayed by the pixel point belongs to teeth. Taking a mouth image including N pixel points as an example, according to an order from left to right and from top to bottom, the first pixel point may correspond to a probability of P1, the second pixel point may correspond to a probability of P2, and by analogy, the Nth pixel point may correspond to a probability of PN.

Then, the probability corresponding to each pixel point may be compared with a preset probability threshold 304, and pixel points corresponding to probabilities larger than the probability threshold 304 are selected as target pixel points. As indicated by reference numeral 305, the probabilities corresponding to the Mth pixel point to the Kth pixel point in the mouth image 301 are larger than the probability threshold 304. Therefore, the pixel points from the Mth pixel point to the Kth pixel point may be taken as target pixel points.

Thereafter, the colors of the target pixel points may be adjusted to be white, thereby obtaining a processed mouth image 306.

According to the method provided by the embodiment of the application, the probability that the content displayed by each pixel point in the mouth image to be processed belongs to corresponding class is judged, and each pixel point is processed according to the judgment result to obtain the processed mouth image, so that precise pixel point-level processing of the mouth image is achieved, and the accuracy of the processing result is improved.

Figure 4:
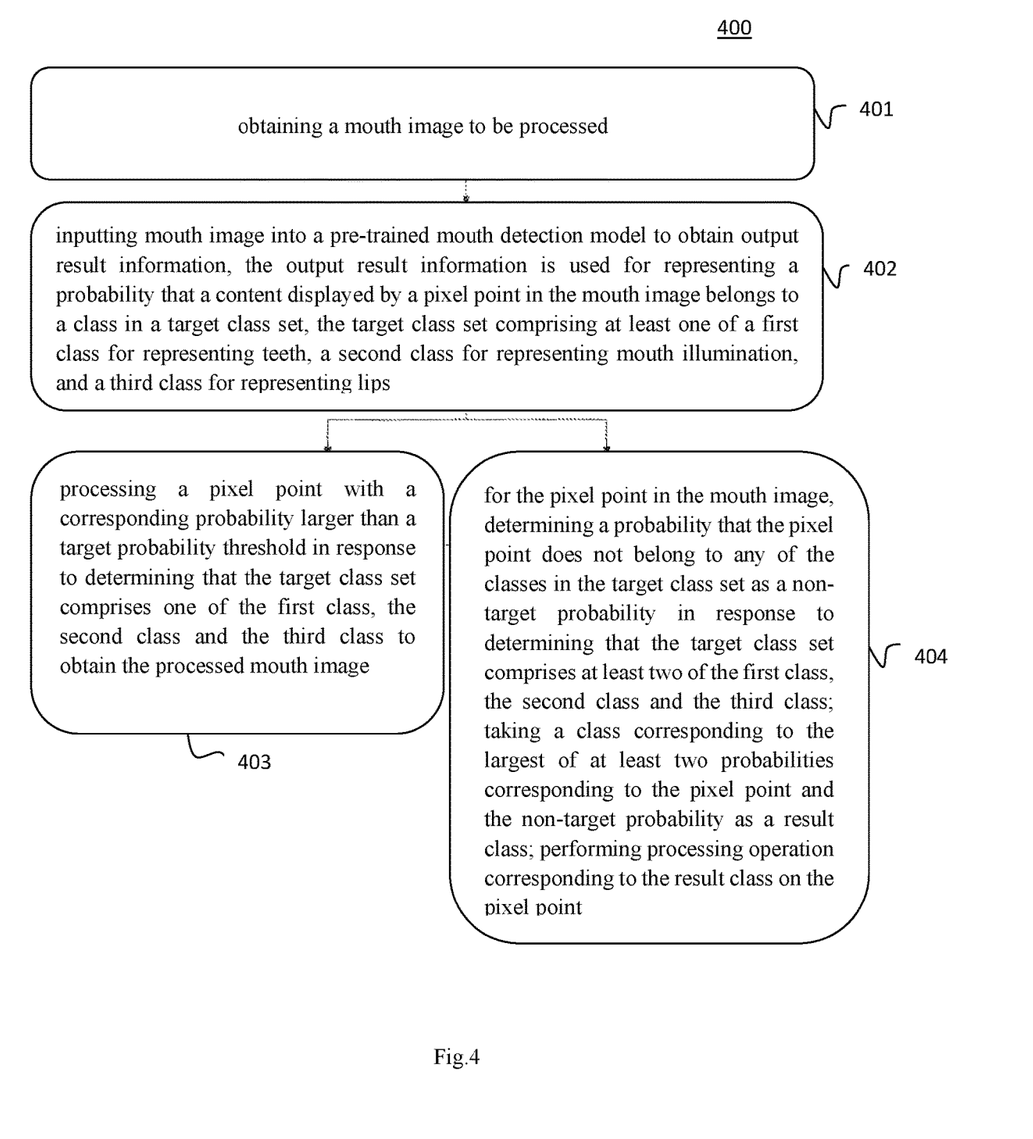
FIG. 4 is a flowchart of the method for processing a mouth image according to yet another embodiment of the present disclosure.

Further referring to FIG. 4, a process flow 400 of yet another embodiment of the method for processing a mouth image is shown. The process flow 400 of the method for processing a mouth image includes the following steps:

Step 401, a mouth image to be processed is obtained.

Step 402, the mouth image is input into a pre-trained mouth detection model to obtain output result information, wherein the output result information is used for representing a probability that a content displayed by pixel point in the mouth image belongs to a class in a target class set, the target class set including at least one of: a first class for representing teeth, a second class for representing mouth illumination, and a third class for representing lips.

Step 403, in response to determining that the target class set includes one of the first class, the second class and the third class, the pixel point with a corresponding probability larger than a target probability threshold is processed to obtain a processed mouth image.

The steps 401, 402, and 403 described above may be specifically implemented with reference to the associated description of steps 201, 202, and 203 in the embodiment corresponding to FIG. 2 and will not be described in further detail herein.

Step 404, in response to determining that the target class set includes at least two of the first class, the second class and the third class, for each pixel point in the mouth image, a probability that the pixel point does not belong to any of the classes in the target class set is determined as a non-target probability; a class corresponding to the maximum probability of at least two probabilities and the non-target probability corresponding to the pixel point is taken as a result class; and processing operation corresponding to the result class is performed on the pixel point.

In this embodiment, when the number of classes contained in the target class set is two or more, the result class corresponding to each pixel point may be determined firstly, and then the processing operation corresponding to the corresponding result class is performed on each pixel point. Among others, the result class corresponding to a pixel point may be used for representing the class to which the content displayed by the pixel point, which is determined according to the probabilities corresponding to the pixel point, belongs.

Specifically, taking the target class set including a first class for representing teeth, a second class for representing mouth illumination, and a third class for representing lips as an example, each pixel point in the mouth image may correspond to a probability set that includes three probabilities.

Thereafter, for each pixel point, a non-target probability corresponding to the pixel point may be determined, wherein the non-target probability may represent classes other than the first class, the second class, and the third class described above.

Alternatively, for each pixel point in the mouth image, the sum of the probabilities corresponding to the pixel point and the non-target probability is one. At this point, for each pixel point, the non-target probability may be obtained by subtracting the sum of the probabilities corresponding to the pixel point from one.

Then, for each pixel point, the class corresponding to the largest of the probabilities of the first class, the second class and the third class and the non-target probability corresponding to the pixel point may be determined as a result class corresponding to the pixel point. For example, if the probability of the first class corresponding to the pixel point is the largest, the content displayed by the pixel point may be considered to belong to the first class, namely the teeth part. If the probability of the second class corresponding to the pixel point is the largest, the content displayed by the corresponding pixel point may be considered to belong to the second class, namely the mouth illumination part. If the probability of the third class corresponding to the pixel point is the largest, the content displayed by the corresponding pixel point may be considered to belong to the third class, namely the lip part. If the non-target probability corresponding to the pixel point is the largest, the content displayed by the corresponding pixel point may be considered to belong to other classes, namely classes other than the classes in the target class set.

After the result class corresponding to each pixel point is determined, corresponding processing may be further carried out on pixel points corresponding to different result classes. For example, for pixel points with the first class as the result class, the colors of the pixel points may be whitened; for pixel points with the second class as the result class, the pixel points may be processed into highlight points in the mouth image; for pixel points with the third class as the result class, the colors of the pixel points may be adjusted to red; and for pixel points with other classes as the result class, the color values of the pixel points may be kept unchanged or the colors of the pixel points may be averaged.

As can be seen from FIG. 4, compared with the embodiment corresponding to FIG. 2, the process flow 400 of the method for processing a mouth image in this embodiment highlights that for different classes in the target class set, pixel points in the mouth image may be specifically subjected to different processing operations, thereby improving the flexibility and versatility in processing of the mouth image.

Figure 5:
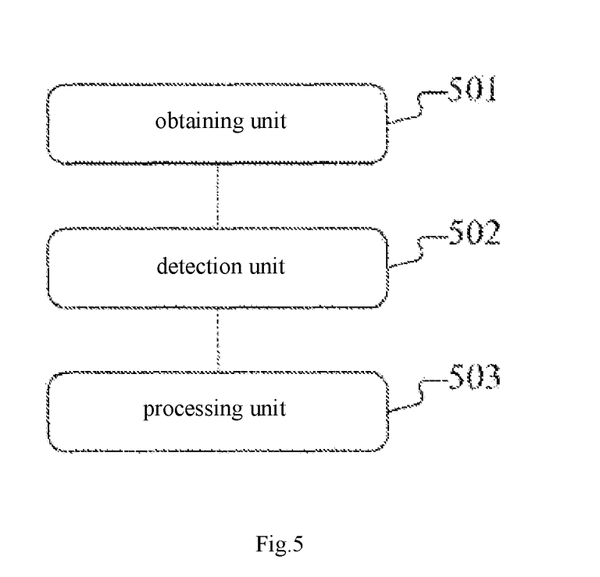
FIG. 5 is a structural schematic diagram of an apparatus for processing a mouth image according to an embodiment of the present disclosure.

Referring further to FIG. 5, as an implementation of the methods illustrated in the figures described above, the present disclosure provides an embodiment of an apparatus for processing a mouth image, corresponding to the method embodiment illustrated in FIG. 2, and the apparatus may be particularly applicable to various electronic devices.

As shown in FIG. 5, the apparatus 500 for processing a mouth image provided in this embodiment includes an obtaining unit 501, a detection unit 502, and a processing unit 503. Among others, the obtaining unit 501 is configured to obtain a mouth image to be processed; the detection unit 502 is configured to input the mouth image into a pre-trained mouth detection model to obtain output result information, wherein the output result information is used for representing a probability that the content displayed by pixel points in the mouth image belongs to a class in a target class set, the target class set including at least one of: a first class for representing teeth, a second class for representing mouth illumination, and a third class for representing lips; and the processing unit 503 is configured to process the mouth image to obtain a processed mouth image according to the output result information.

In this embodiment, in the apparatus 500 for processing a mouth image: specific processings and resulting technical effects of the obtaining unit 501, the detection unit 502, and the processing unit 503 may refer to the relevant descriptions of the steps 201, 202, and 203 in the embodiment corresponding to FIG. 2, respectively, and will not be described in detail herein.

In some alternative implementations of this embodiment, the processing unit 503 is further configured to: in response to determining that the target class set includes one of the first class, the second class and the third class, process the pixel point with a corresponding probability larger than a target probability threshold to obtain a processed mouth image.

In some alternative implementations of this embodiment, the target class set includes the second class; and the processing unit 503 is further configured to: select a pixel point with a corresponding probability larger than a target probability threshold as a target pixel point to obtain a target pixel point set; and process each target pixel point in the target pixel point set, such that the processed target pixel point becomes a highlight point in the mouth image.

In some alternative implementations of this embodiment, the processing unit 503 is further configured to: in response to determining that the target class set includes at least two of the first class, the second class and the third class, for pixel point in the mouth image, determine a probability that the pixel point does not belong to any of the classes in the target class set as a non-target probability; take a class corresponding to the maximum probability of at least two probabilities and the non-target probability corresponding to the pixel point as a result class; and perform processing operation corresponding to the result class on the pixel point.

In some alternative implementations of this embodiment, for pixel point in the mouth image, the sum of the probabilities corresponding to the pixel point and the non-target probability is one.

In some alternative implementations of this embodiment, the mouth detection model may be obtained by training according to the following steps: an initial class detection model is obtained, wherein the initial class detection model includes an initial mouth detection model and an initial classification model connected with the initial mouth detection model, wherein the initial classification model takes an output of the initial mouth detection model as an input, and class information representing a class to which a content displayed by pixel point in a mouth image belongs as an output a training sample set is obtained, wherein a training sample includes a mouth image and class information used for representing a class to which a content displayed by pixel point in the mouth image belongs; training is carried out using a machine learning method with the mouth image in each training sample in the training sample set as an input of the initial class detection model and the class information corresponding to the input mouth image as an expected output of the initial class detection model to obtain a trained initial class detection model; and a trained initial mouth detection model included in the trained initial class detection model is determined as the mouth detection model.

According to the apparatus provided by the embodiment of the present disclosure, the obtaining unit obtains a mouth image to be processed; the detection unit inputs the mouth image into a pre-trained mouth detection model to obtain output result information, wherein the output result information is used for representing a probability that a content displayed by pixel point in the mouth image belongs to a class in a target class set, the target class set including at least one of a first class for representing teeth, a second class for representing mouth illumination, and a third class for representing lips; and the processing unit processes the mouth image to obtain a processed mouth image according to the output result information, so that the content displayed by the pixel point is classified according to a probability that each pixel point in the mouth image belongs to a corresponding class, thereby achieving pixel point level processing of the mouth image, and also improving precision and accuracy of the processing.

Figure 6:
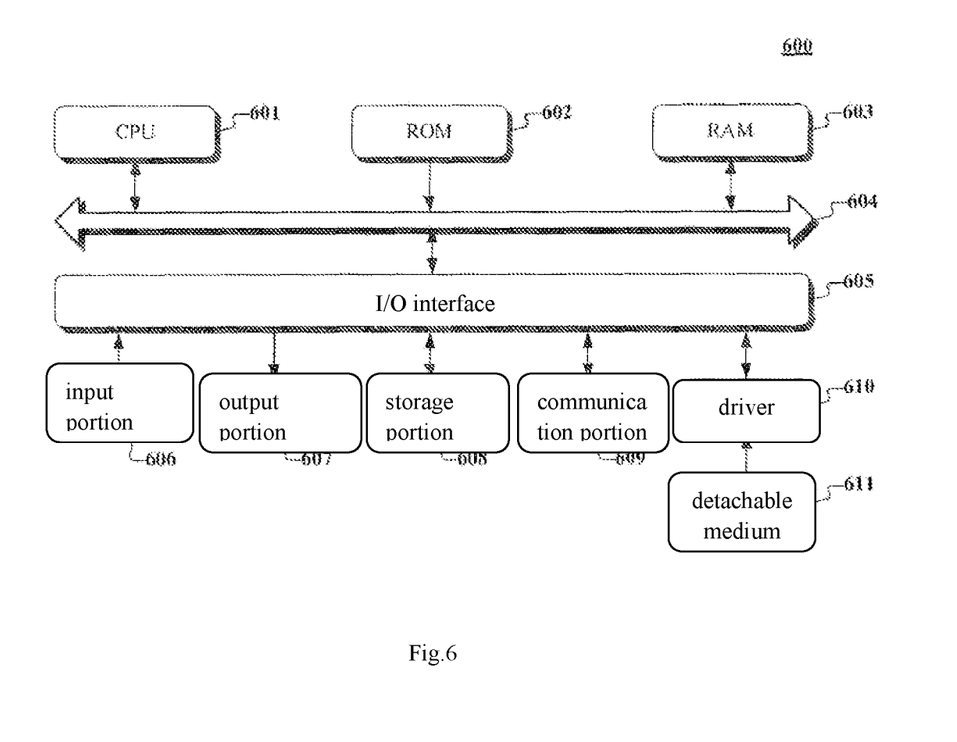
FIG. 6 is a structural schematic diagram of a computer system of an electronic device suitable for implementing an embodiment of the present disclosure.

Reference is now made to FIG. 6 which shows a structure schematic diagram of a computer system 600 of electronic device applicable to implementing an embodiment of the present application. The electronic device shown in FIG. 6 is merely an example and should not pose any limitation on functions and application ranges of the embodiments of the present application.

As shown in FIG. 6, the computer system 600 comprises a central processing unit (CPU) 601 which can execute various appropriate actions and processes according to programs stored in a read-only memory (ROM) 602 or programs loaded to a random-access memory (RAM) 603 from a storage portion 608. Various programs and data required by operation of the system 600 are also stored in the RAM 603. The CPU 601, ROM 602 and RAM 603 are connected to one another through a bus 604. An input/output (I/O) interface 605 is also connected to the bus 604.

The I/O interface 605 is connected with following components: an input portion 606 including a keyboard, a mouse, etc; an output portion 607 including a cathode-ray tube (CRT), a liquid crystal display (LCD), a loudspeaker, etc; a storage portion 608 including a hard disk, etc; and a communication portion 609 including a network interface card such as an LAN card and a modem. The communication portion 609 executes communication through networks such as the Internet. A driver 610 is also connected to the I/O interface 605 as required. A detachable medium 611, such as a magnetic disk, an optical disk, a magneto-optical disk and a semiconductor memory, is installed on the driver 610 as required, so that computer programs read from the detachable medium can be installed into the storage portion 608 as required.

Specifically, processes described above with reference to flowcharts may be implemented as computer software programs in accordance with embodiments of the present disclosure. For example, an embodiment of the present application comprises a computer program product which comprises a computer program carried on a computer readable medium, and the computer program comprises program codes used for executing the method shown in the flowchart. In such embodiment, the computer program may be downloaded from the network through the communication portion 609 and installed, and/or downloaded from the detachable medium 611 and installed. When the computer program is executed by the central processing unit (CPU) 601, a function defined in the method provided by the present application is executed.

It should be noted that the computer readable medium of the present application may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present disclosure, the computer readable storage medium may be any tangible medium that contains or stores a program that can be used by or in combination with an instruction execution system, apparatus, or device. In the present disclosure, a computer readable signal medium may include a data signal propagating in a baseband or as a part of a carrier wave, wherein computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The flowcharts and block diagrams in the figures illustrate the possible system architecture, functions, and operation of systems, methods, and computer program products according to various embodiments of the present application. In view of this, each block in the flowcharts or block diagrams may represent a module, a program segment, or a portion of codes, and the module, the program segment, or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of the blocks in the block diagrams and/or flowcharts can be implemented by dedicated hardware-based systems used for carrying out the specified functions or operation, or can be implemented by combinations of dedicated hardware and computer instructions.

The units described in the embodiments of the present disclosure may be implemented in software or in hardware. The described units may also be provided in a processor for example, may be described as: a processor including an obtaining unit, a detection unit, and a processing unit. Among others, in some cases, the names of these units do not constitute a limiting of the unit itself, for example, the obtaining unit may also be described as "a unit for obtaining a mouth image to be processed".

As another aspect, the present disclosure also provides a computer-readable medium, which may be included in the electronic device described in the above embodiment; it may also be separate and not assembled into the electronic device. The computer-readable medium carries one or more programs that, when executed by the electronic device, cause the electronic device to: obtain a mouth image to be processed; input the mouth image into a pre-trained mouth detection model to obtain output result information, wherein the output result information is used for representing a probability that a content displayed by pixel point in the mouth image belongs to a class in a target class set, the target class set including at least one of: a first class for representing teeth, a second class for representing mouth illumination, and a third class for representing lips; and according to the output result information, process the mouth image to obtain a processed mouth image.

The above description is merely the illustration of preferred embodiments of the present disclosure and the technical principles used. It should be understood by those skilled in the art that the scope of the present disclosure referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present disclosure.

The invention claimed is:

1. A method for processing a mouth image, comprising:
obtaining a mouth image to be processed;
inputting the mouth image into a pre-trained mouth detection model to obtain an output result information, wherein the output result information represents a probability that a content displayed by a pixel point in the mouth image belongs to a class in a target class set, the target class set comprising at least one of a first class for representing teeth, a second class for representing mouth illumination, and a third class for representing lips; and
processing the mouth image according to the output result information to obtain a processed mouth image, wherein the processing the mouth image according to the output result information to obtain a processed mouth image further comprises:
processing the pixel point with a corresponding probability larger than a target probability threshold to obtain the processed mouth image in response to determining that the content displayed by the pixel point belongs to one of the first class, the second class or the third class.

2. The method according to claim 1, wherein the target class set comprises the second class; and wherein the processing the pixel point with a corresponding probability larger than a target probability threshold to obtain the processed mouth image further comprises:
selecting pixel points with corresponding probabilities larger than the target probability threshold as target pixel points to obtain a set of target pixel points; and
processing the target pixel points in the set of target pixel points such that the processed target pixel points become a highlight point in the mouth image.

3. The method according to claim 1, wherein the processing the mouth image according to the output result information to obtain a processed mouth image comprises:
for the pixel point in the mouth image, determining a probability that the pixel point does not belong to any of the classes in the target class set as a non-target probability in response to determining that the target class set comprises at least two of the first class, the second class and the third class;
taking a class corresponding to the largest of at least two probabilities corresponding to the pixel point and the non-target probability as a result class; and
performing processing operation corresponding to the result class on the pixel point.

4. The method according to claim 3, wherein for the pixel point in the mouth image, a sum of the probabilities corresponding to the pixel point and the non- target probability is one.

5. The method according to claim 1, wherein the mouth detection model is obtained by a training process comprising:
obtaining an initial class detection model, wherein the initial class detection model comprises an initial mouth detection model and an initial classification model connected with the initial mouth detection model, wherein the initial classification model takes an output of the initial mouth detection model as an input, and class information representing a class to which a content displayed by the pixel point in the mouth image belongs as an output;
obtaining a training sample set, wherein a training sample comprises a mouth image and class information used for representing a class to which a content displayed by the pixel point in the mouth image belongs;

carrying out training using a machine learning method with the mouth image in the training sample in the training sample set as an input of the initial class detection model and the class information corresponding to the input mouth image as an expected output of the initial class detection model to obtain a trained initial class detection model; and determining a trained initial mouth detection model comprised in the trained initial class detection model as the mouth detection model.

6. An apparatus for processing a mouth image, comprising:

one or more processors; and a storage device with one or more programs stored therein, wherein the one or more programs, when executed by the one or more processors, cause the one or more processors to implement operations for processing a mouth image, the operations comprising:

obtaining a mouth image to be processed;

inputting the mouth image into a pre-trained mouth detection model to obtain an output result information, wherein the output result information represents a probability that a content displayed by a pixel point in the mouth image belongs to a class in a target class set, the target class set comprising at least one of a first class for representing teeth, a second class for representing mouth illumination, and a third class for representing lips; and processing the mouth image according to the output result information to obtain a processed mouth image, wherein the processing the mouth image according to the output result information to obtain a processed mouth image further comprises:

processing the pixel point with a corresponding probability larger than a target probability threshold to obtain the processed mouth image in response to determining that the content displayed by the pixel point belongs to one of the first class, the second class or the third class.

7. The apparatus according to claim 6, wherein the target class set comprises the second class; and wherein the processing the pixel point with a corresponding probability larger than the target probability threshold to obtain the processed mouth image further comprises:

selecting pixel points with corresponding probabilities larger than the target probability threshold as target pixel points to obtain a set of target pixel points; and processing the target pixel points in the set of target pixel points such that the processed target pixel points become a highlight point in the mouth image.

8. The apparatus according to claim 6, wherein the processing the mouth image according to the output result information to obtain a processed mouth image comprises:

for the pixel point in the mouth image, determining a probability that the pixel point does not belong to any of the classes in the target class set as a non-target probability in response to determining that the target class set comprises at least two of the first class, the second class and the third class;

taking a class corresponding to the largest of at least two probabilities corresponding to the pixel point and the non-target probability as a result class; and performing processing operation corresponding to the result class on the pixel point.

9. The apparatus according to claim 8, wherein for the pixel point in the mouth image, a sum of the probabilities corresponding to the pixel point and the non-target probability is one.

10. The apparatus according to claim 6, wherein the mouth detection model is obtained by a training process comprising:

obtaining an initial class detection model, wherein the initial class detection model comprises an initial mouth detection model and an initial classification model connected with the initial mouth detection model, wherein the initial classification model takes an output of the initial mouth detection model as an input, and class information representing a class to which a content displayed by the pixel point in the mouth image belongs as an output;

obtaining a training sample set, wherein a training sample comprises a mouth image and class information used for representing a class to which a content displayed by the pixel point in the mouth image belongs;

carrying out training using a machine learning method with the mouth image in the training sample in the training sample set as an input of the initial class detection model and the class information corresponding to the input mouth image as an expected output of the initial class detection model to obtain a trained initial class detection model; and determining a trained initial mouth detection model comprised in the trained initial class detection model as the mouth detection model.

11. A non-transitory computer readable medium with a computer program stored therein, wherein the program, when executed by a processor, causes the processor to implement a method for processing a mouth image, wherein the method for processing a mouth image comprising:

obtaining a mouth image to be processed;

inputting the mouth image into a pre-trained mouth detection model to obtain an output result information, wherein the output result information represents a probability that a content displayed by a pixel point in the mouth image belongs to a class in a target class set, the target class set comprising at least one of a first class for representing teeth, a second class for representing mouth illumination, and a third class for representing lips; and processing the mouth image according to the output result information to obtain a processed mouth image, wherein the processing the mouth image according to the output result information to obtain a processed mouth image further comprises:

processing the pixel point with a corresponding probability larger than a target probability threshold to obtain the processed mouth image in response to determining that the content displayed by the pixel point belongs to one of the first class, the second class or the third class.

12. The non-transitory computer readable medium according to claim 11, wherein the target class set comprises the second class; and wherein the processing the pixel point with a corresponding probability larger than a target probability threshold to obtain the processed mouth image further comprises:

selecting pixel points with corresponding probabilities larger than the target probability threshold as target pixel points to obtain a set of target pixel points; and processing the target pixel points in the set of target pixel points such that the processed target pixel points become a highlight point in the mouth image.

13. The non-transitory computer readable medium according to claim 11, wherein the processing the mouth image according to the output result information to obtain a processed mouth image comprises:
- for the pixel point in the mouth image, determining a probability that the pixel point does not belong to any of the classes in the target class set as a non-target probability in response to determining that the target class set comprises at least two of the first class, the second class and the third class;
- taking a class corresponding to the largest of at least two probabilities corresponding to the pixel point and the non-target probability as a result class; and
- performing processing operation corresponding to the result class on the pixel point.

14. The non-transitory computer readable medium according to claim 13, wherein for the pixel point in the mouth image, a sum of the probabilities corresponding to the pixel point and the non-target probability is one.

15. The non-transitory computer readable medium according to claim 11, wherein the mouth detection model is obtained by a training process comprising:
- obtaining an initial class detection model, wherein the initial class detection model comprises an initial mouth detection model and an initial classification model connected with the initial mouth detection model, wherein the initial classification model takes an output of the initial mouth detection model as an input, and class information representing a class to which a content displayed by the pixel point in the mouth image belongs as an output;
- obtaining a training sample set, wherein a training sample comprises a mouth image and class information used for representing a class to which a content displayed by the pixel point in the mouth image belongs;
- carrying out training using a machine learning method with the mouth image in the training sample in the training sample set as an input of the initial class detection model and the class information corresponding to the input mouth image as an expected output of the initial class detection model to obtain a trained initial class detection model; and
- determining a trained initial mouth detection model comprised in the trained initial class detection model as the mouth detection model.

* * * * *